United States Patent [19]
Lin et al.

[11] Patent Number: 6,065,869
[45] Date of Patent: May 23, 2000

[54] METHOD OF IN-LINE TEMPERATURE MONITORING

[75] Inventors: Jen-Tsung Lin, Taichung; Da-Wen Shia; Tsung-Hsien Han, both of Taipei; Eddie Chen, Hsinchu, all of Taiwan

[73] Assignee: United Silicon Incorporated, Hsinchu, Taiwan

[21] Appl. No.: 09/356,962

[22] Filed: Jul. 19, 1999

[30] Foreign Application Priority Data

Mar. 2, 1999 [TW] Taiwan .................................. 88103138

[51] Int. Cl.$^7$ ....................................................... G01K 7/16
[52] U.S. Cl. ........................... 374/183; 374/141; 392/416; 219/390; 438/18
[58] Field of Search .................................. 374/183, 1, 178, 374/185, 141; 438/17, 18; 219/390, 405, 411; 392/416, 418; 118/724, 725, 50.1

[56] References Cited

U.S. PATENT DOCUMENTS

| | | | |
|---|---|---|---|
| 5,401,099 | 3/1995 | Nishizawa et al. | 374/178 |
| 5,435,646 | 7/1995 | McArthur et al. | 374/185 |
| 5,899,703 | 5/1999 | Kalter et al. | 438/18 |
| 5,902,504 | 5/1999 | Merchant et al. | 219/497 |
| 5,970,313 | 10/1999 | Rowland et al. | 438/17 |
| 5,994,676 | 11/1999 | Dutartre | 219/497 |
| 5,997,174 | 12/1999 | Wyland | 374/43 |

FOREIGN PATENT DOCUMENTS 1037084  8/1983  U.S.S.R. .................................. 374/185

*Primary Examiner*—Diego Gutierrez
*Assistant Examiner*—Lydia De Jesús
*Attorney, Agent, or Firm*—Thomas, Kayden, Horstemeyer & Risley

[57] ABSTRACT

A method of in-line temperature monitoring. At least two control wafers and a monitor wafer are provided. A sacrificial layer is formed on each control wafer and the monitor wafer. Ions are implanted under a predetermined condition in the sacrificial layers. Thermal processes are performed on the control wafers at a higher and the lower limit of a target temperature to enable ions to move partially from the sacrificial layer to the control wafers. The sacrificial layers on the control wafers are subsequently removed. The sheet resistance of the control wafers is measured to obtain a first and the second resistance value, which respectively correspond to the first and second temperatures. A wafer and a monitor wafer are provided. A thermal process is performed on the monitor wafer and the wafer at the target temperature. The sacrificial layer of the monitor wafer is removed, and the sheet resistance of the monitor wafer is subsequently measured. When the sheet resistance of the monitor wafer is between the first and the second sheet resistance, the temperature is controlled between the first and second temperature, that is, a tolerable temperature range of the target temperature.

21 Claims, 2 Drawing Sheets

METHOD OF IN-LINE TEMPERATURE MONITORING

CROSS-REFERENCE TO RELATED APPLICATION

This application claims the priority benefit of Taiwan application serial no. 88103138, filed Mar. 2, 1999, the full disclosure of which is incorporated herein by reference.

BACKGROUND OF THE INVENTION

1. Field of Invention

The invention relates in general to a method of temperature monitoring, and more particularly to a method of in-line temperature monitoring.

2. Description of Related Art

In semiconductor processes, thermal processes are typically performed in a furnace, of which the temperature is commonly monitored by thermocouples. The way to control the temperature of the furnace is to set an upper and a lower temperature limit through a program. Being monitored by the thermocouples, any abnormal temperature variation or fluctuation can be avoided. If the thermal process is a thermal oxidation process, a variation of the film thickness can be measured as another reference to determine whether the furnace temperature is as specifically required or not.

However, while the film thickness is kept constant since the film does not grow during ion drive-in, anneal and densification processes, the method to monitor the furnace temperature is restricted to the usage of thermocouples only. Should any peripheral hardware of monitoring the furnace temperature malfunction, the temperature cannot be correctly monitored, a great cost is lost due to a large quantity of faulty or failure products.

SUMMARY OF THE INVENTION

The invention provides a method of in-line temperature monitoring for a semiconductor thermal process. At least two control wafers are provided. A sacrificial layer with a default thickness is formed on each of the control wafers. Each sacrificial layer comprises ions implanted according to a predetermined condition. Two thermal process steps under a first and a second temperature are performed on the control wafers, respectively. Assume that the semiconductor thermal process is performed on a product wafer at a target temperature, the first temperature and the second temperature thus enclose a temperature range including the target temperature. Therefore, a part of the ions are diffused into the control wafers from the sacrificial layers. The sacrificial layers are removed. A sheet resistance of each of the control wafers is measured, so that a first and a second sheet resistance respectively corresponding to the first and the second temperatures are obtained. A product wafer and a monitor wafer are provided. The monitor wafer comprises a sacrificial layer with the predetermined thickness as the sacrificial layers formed on the control wafers. Similarly, the monitor wafer comprises ions implanted under a same condition as those ions implanted into the sacrificial layers on the control wafers. The semiconductor thermal process is performed on the monitor wafer and the product wafer at the same time. The sacrificial layer of the monitor wafer is removed, followed by measuring the sheet resistance of the monitor wafer. If the value of sheet resistance of the monitor wafer is between the values of the first and the second sheet resistance, the temperature is kept between the first and the second temperatures. That is, whether a reading temperature for performing the thermal process on the product wafer does reflect a real process temperature can be confirmed.

The invention thus provides a method to in-line monitor a temperature of the furnace in which a thermal process is performed on a product wafer. Even when the thermal process is performed on those wafers which does not have a thermally grown film thereon, should any peripheral hardware malfunction to cause an abnormal temperature fluctuation, it can be reflected by the measured resistance of the monitor wafer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
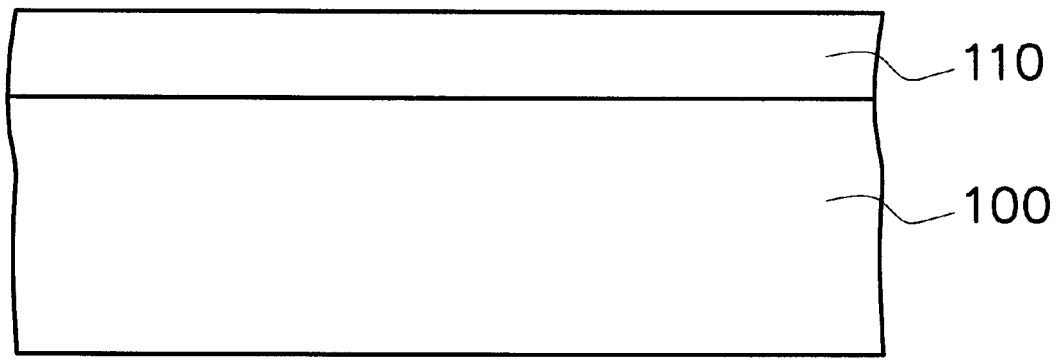
FIG. 1A to FIG. 1D show steps of processing two control wafers and a monitor wafer used in a preferred embodiment in the invention.

In the invention, two control wafers, a monitor wafer, and a product wafer are provided. The control wafers are used to obtain a tolerable temperature range of a target temperature for performing a thermal process on the product wafer, where the tolerable temperature range is defined by sheet resistance of the control wafers. The monitor wafer is disposed into a furnace together with the product wafer during the thermal process. By measuring a value of sheet resistance of the monitor wafer, whether a real process temperature of the furnace during the thermal process is within the tolerable temperature range can be determined. Therefore, whether the reading temperature of the furnace obtained by a thermocouple correctly reflects the real process temperature can be confirmed.

Two control wafers and a monitor wafer are provided. The steps of processing the control wafers and the monitor wafer before disposing these wafers into a furnace for thermal process are similar. Therefore, In FIG. 1A to FIG. 1D, processes performed on a wafer denoted by a reference numeral 100 are performed on both the control wafers and the monitor wafer.

In FIG. 1A, a sacrificial layer 110, for example, a silicon oxide layer formed by chemical vapor deposition or other deposition layer made of other material, such as silicon nitride, is formed on the control wafers 100.

Figure 1B:
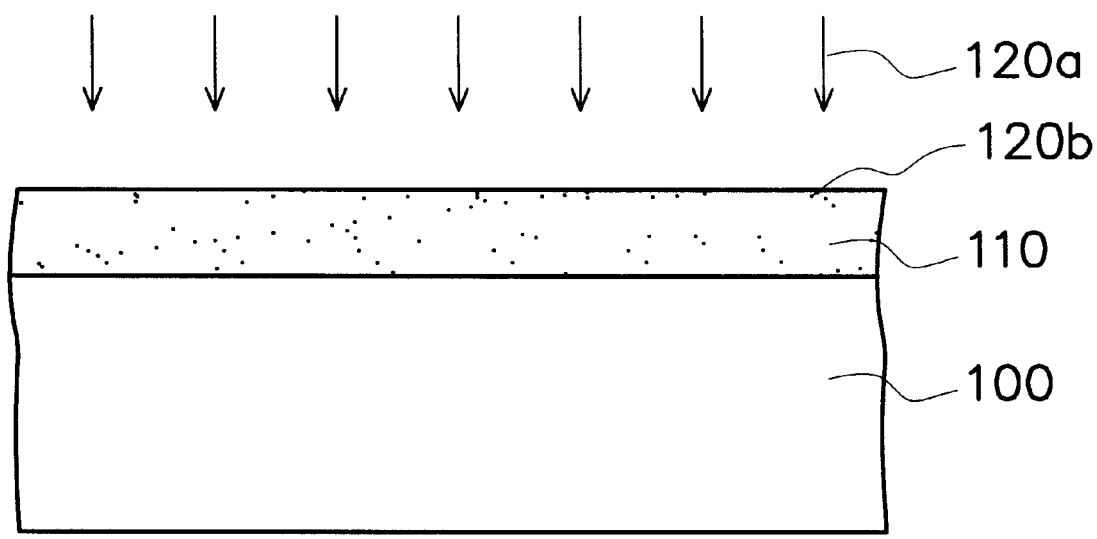

In FIG. 1B, according to material and thickness of the sacrificial layer 110, ions 120a are implanted into the sacrificial layer 110. For example, when the sacrificial layer 110 is silicon oxide layer and its thickness is about 4000 Å, the preferred ions source 120a are phosphorus ions, the preferred implant energy is about 250 KeV, and the preferred implant dose is about $5 \times 10^{13}$ atom/cm$^2$. The ions 120a include P or N type ions. For example, if the wafer 100 is P type, then the ions 120a are N type. If the wafer 100 is N type, then the ions 120a are P type. And the ions 120a are preferably selected from ions with a substantially slow thermal diffusion rate in the sacrificial layer 110. The ions contained in the sacrificial layer 110 after the implantation step are denoted by a reference numeral 120b.

Figure 1C:
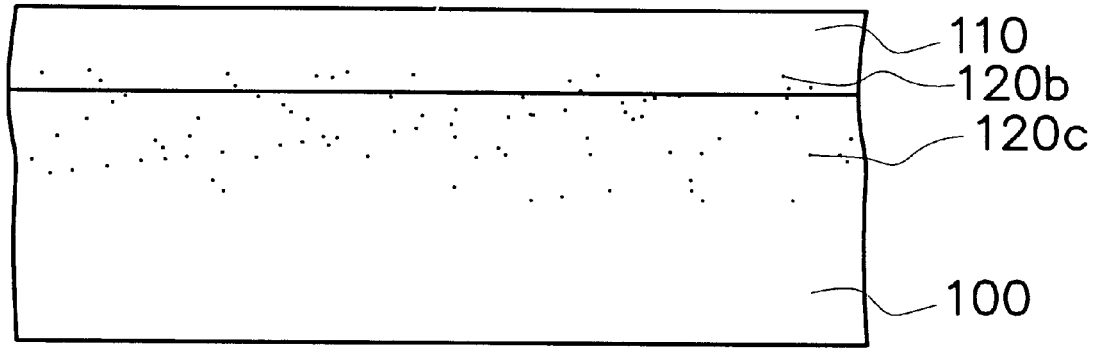

In FIG. 1C, while a thermal process, such as annealing, densification, ion drive-in, or similar process is performed on the control wafers 100, a part of the ions 120b diffuses from the sacrificial layer 110 into the control wafers 100. During the thermal process, ions 120b in the sacrificial layer 110 receive enough kinetic energy at a high temperature to diffuse from a position with a higher concentration to a position with a lower concentration.

Thermal processes are performed on the control wafers 100 by disposing the control wafers 100 under furnaces at different temperatures. A thermal process is performed at a first temperature $T_1$ on one control wafer 100, and another thermal process is performed at a second temperature $T_2$ on the other control wafer 100. The first temperature $T_1$ and the second temperature $T_2$ are determined as an upper limit and a lower limit for a target temperature TT for a thermal process which is to be performed on the product wafer. That is, a tolerable temperature range between the first and the second temperature $T_1$ and $T_2$ encloses the target temperature TT.

During the thermal processes, a part of the implanted ions 120b gradually diffuses into each of the control wafer 100 to increase the ion concentration of the control wafers 100, and consequently, values of sheet resistance of the control wafers 100 are decreased. Under a same implantation condition, for a sacrificial layer 110 with a constant thickness, the higher the temperature is, the more ions 120b diffuse into the wafer 100. Therefore, the concentration of ions 120c in the wafer 100 increases as the temperature increases.

Figure 1D:
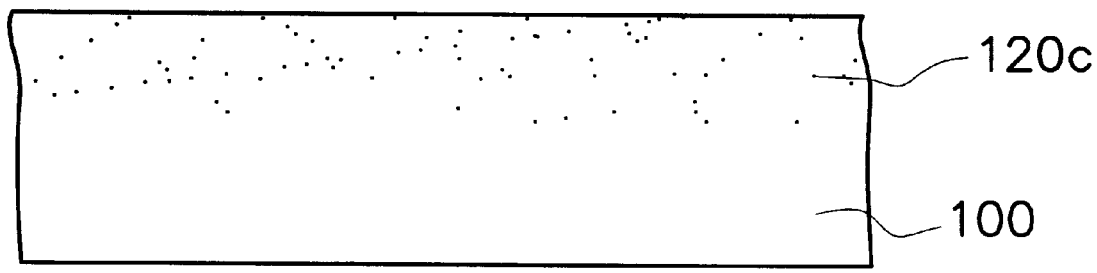

It is known that a wafer containing more ions has a lower value of sheet resistance. The value of sheet resistance of the control wafer 100 thus reflects the temperature of the thermal processes. In FIG. 1D, after the thermal processes, the control wafers 100 are removed from the furnaces. The sacrificial layer 110 is removed, for example, by wet etching or dry etching. The sheet resistance of the control wafer 100 being processed under the first temperature $T_1$ is measured and has a value of $Rs(T_1)$, while the sheet resistance of the control wafer 100 being processed under the second temperature $T_2$ is denoted as $Rs(T_2)$. The values of sheet resistance $Rs(T_1)$ and $Rs(T_2)$ directly reflects a tolerable temperature range between $T_1$ and $T_2$ for performing the thermal process on the product wafer.

As mentioned above, the monitor wafer is processed as the above method like the control wafers 100. That is, a sacrificial wafer is formed on the monitor wafer, followed by being implanted with ions. The monitor wafer and the product wafer are then disposed into a furnace. The thermal process is performed on the monitor wafer and the product wafer. A reading temperature RT of the furnace, for example, a temperature read or obtained from a thermocouple, is set equivalent to the target temperature TT, so that the thermal process is presumably performed at the target temperature TT. After the thermal process, the monitor wafer is removed from the furnace. The sacrificial layer is removed, and the sheet resistance of the monitor wafer is measured as Rs(T). The value of sheet resistance Rs(T) thus reflects a real temperature T of the furnace during the thermal process. If Rs(T) is no larger than a large one and no smaller than a small one among the values of sheet resistance $Rs(T_1)$ and $Rs(T_2)$, the reading temperature RT thus reflects a real process temperature of the thermal process. On the contrary, if the value of sheet resistance Rs(T) falls beyond a range between $Rs(T_1)$ and $Rs(T_2)$, the real process temperature T thus exceeds the tolerable temperature range of the target temperature TT. Therefore, it indicates that the thermocouple can not detect a real temperature T of the furnace correctly. The temperature of the furnace is thus out of control. Therefore, maintenance for temperature control of the furnace is required.

Table 1 shows an empirical data obtained from implementing the above method. In the implementation, a thermal process at a target temperature TT of 1000° C. is to be performed on a product wafer. A tolerable temperature range is set at ±5° C. and ±10° C. That is, the first temperature $T_1$ is set at 1005° C. and 1010° C., while the second temperature $T_2$ is set 995° C. and 990° C. A sacrificial layer with a thickness of about 4000 Å is formed on a first control wafer, a second control wafer and a monitor wafer. Ions having a concentration of $5 \times 10^{13}$ atom/cm$^2$ are implanted into the sacrificial layer with an implanting energy 250 KeV. After the thermal processes of the control wafers, values of the sheet resistance of the control wafers are measured. In addition, the product wafer and the monitor wafer are disposed at a furnace by setting a reading temperature of 1000° C. for a thermal process. The sheet resistance Rs(1000° C.) of the monitor wafer after being removed from the furnace and removed with the sacrificial layer is measured as well. As shown in the table, Rs(1010° C., 1005° C.)>$R_s$(1000° C.)>Rs(995° C., 990° C.). Therefore, the real temperature T of the thermal process is within the tolerable range between $T_1$ and $T_2$, so that the reading temperature RT precisely indicates the target temperature TT.

TABLE 1

| Temperature (° C.) | Value of Sheet Resistance (Ω/cm$^2$) | Uniformity (%) |
| --- | --- | --- |
| 990 | 1654.0 | 0.92 |
| 995 | 1608.0 | 0.92 |
| 1000 | 1547.0 | 0.90 |
| 1005 | 1508.0 | 0.94 |
| 1010 | 1460.0 | 0.83 |

On Table 1, another parameter "uniformity" is also presented. The uniformity reflecting the distribution of the implanted ions after the thermal process is measured by the standard deviation. The larger the standard deviation is, the poorer the uniformity is. Typically, the method provided by the invention may monitor the furnace temperature precisely while the uniformity is no larger than 1%. As shown in the table, the uniformity is less than 1% using the above method.

In addition, the monitoring sensitivity can be obtained by the relationship of:

Sensitivity (±5° C.)=[Rs(995)−Rs(1005)]/Rs(1000)     (1)

Sensitivity (±10° C.)=[Rs(990)−Rs(1010)]/Rs(1000)     (2)

If the Rs value is between 1508.0–1608.0 Ω/cm$^2$ and the temperature of the thermal process is between 1000±5° C., the sensitivity for (±10° C. ) is 12.5%, and the sensitivity for (±5° C.) is even up to 6.5%. Therefore, it is easy to know whether or not the temperature deviated.

As a comparison, the invention is also performed on wafers without sacrificial layers thereon. That is, two bare control wafers and one bare monitor wafer are provided. The control wafers and the monitor wafer are doped with a dopant concentration of about $5 \times 10^{13}$ atom/cm$^2$ and an implantation energy at 50 KeV, and a dopant concentration of about $2 \times 10^{13}$ atom/cm$^2$ and an implantation energy at 250 KeV. The experiment results are shown as Table 2. The control wafers are disposed into a furnace for thermal process at 900° C. and 1010° C., while the target temperature is about 1000° C.

As shown in Table 2, no matter whether the dopant concentration is about $5\times10^{13}$ atom/cm$^2$ or $2\times10^{13}$ atom/cm$^2$, the uniformity at each temperature is larger than a tolerable value of 1%. Moreover, being calculated from the above relationship, the sensitivity is 2.2% for the concentration of $5\times10^{13}$ atom/cm$^2$, and 0% for $2\times10^{13}$ atom/cm$^2$. Comparing to the results represented in Table 1, the wafers with a sacrificial layers thereon has a better performance to implement the method of in-line temperature monitor for the thermal process disclosed in the invention.

TABLE 2

| Temperature (° C.) | Dopant | Value of Sheet Resistance (Ω/cm$^2$) | Uniformity (%) |
|---|---|---|---|
| 990 | $5 \times 10^{13}$/cm$^2$ | 707.5 | 2.40 |
|  | $2 \times 10^{13}$/cm$^2$ | 396.8 | 0.50 |
| 1000 | $5 \times 10^{13}$/cm$^2$ | 705.7 | 0.69 |
|  | $2 \times 10^{13}$/cm$^2$ | 401.2 | 0.44 |
| 1010 | $5 \times 10^{13}$/cm$^2$ | 692.2 | 2.83 |
|  | $2 \times 10^{13}$/cm$^2$ | 398.7 | 0.86 |

In summary, by the invention, even if the thermocouple is out of order, whether the temperature of thermal process is controlled within a tolerable range of a target temperature can be monitored. Once there is anything undesired temperature fluctuation which affects the quality of product wafers, it can be monitored and an appropriate treatment to the furnace or the product wafers can thus be performed to minimize the fabrication lost. Therefore, the product yield can be largely raised. In addition, this invention can be used in any thermal process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of in-line temperature monitoring, comprising:

providing at least two control wafers, a monitor wafer, and at least one product wafer;

forming a sacrificial layer over each of the control wafers and the monitor wafer;

implanting ions into these sacrificial layers;

performing thermal processes on a first of the two control wafers at a first temperature and a on second of the two control wafers at a second temperature, wherein the first temperature and the second temperature enclose a temperature range covering a target temperature for performing a thermal process on the monitor wafer and the product wafer;

removing the sacrificial layers on the control wafers;

measuring values of sheet resistance of the first and the second control wafers to obtain a first sheet resistance and a second sheet resistance corresponding to the first temperature and the second temperature, respectively;

performing a thermal process on the monitor wafer and the product wafer by setting a reading temperature at the target temperature;

removing the sacrificial layer on the monitor wafer; and measuring a sheet resistance of the monitor wafer.

2. The method of claim 1, wherein the ions include P type ions.

3. The method of claim 1, wherein the ions include N type ions.

4. The method of claim 1, wherein the semiconductor thermal process includes an annealing process.

5. The method of claim 1, wherein the semiconductor thermal process includes a densification process.

6. The method of claim 1, wherein the semiconductor thermal process includes an ion drive-in process.

7. The method of claim 1, wherein the sacrificial layer comprises a silicon oxide layer.

8. The method of claim 7, wherein the sacrificial layer has a thickness of about 4000 Å.

9. The method of claim 8, wherein the ions are implanted into the sacrificial layer include phosphorus ions with a concentration of about $5\times10^{13}$ atom/cm$^2$ at an implantation energy of about 250 KeV.

10. The method of claim 1, wherein the sacrificial layer comprises a silicon nitride layer.

11. A method of in-line temperature monitoring, comprising:

providing a first control wafer, a second control wafer, a monitor wafer, and at least a product wafer, wherein the product wafer is to be disposed at a furnace at a target temperature for performing a target thermal process;

forming a sacrificial layer on each of the first control wafer, the second control wafer, and the monitor wafer;

implanting each sacrificial layer with a dopant concentration at an implantation energy;

performing a first thermal process on the first control wafer at a first temperature which is a higher limit of the target temperature;

performing a second thermal process on the second control wafer at a second temperature which is a lower limit of the target temperature;

removing the sacrificial layer on each of the first and the second control wafers;

measuring sheet resistance of the first and the second control wafers to obtain a first resistance value and a second resistance value, respectively;

performing the target thermal process on both the monitor wafer and the product wafer by setting the furnace at the target temperature;

removing the sacrificial layer on the monitor wafer;

measuring sheet resistance of the monitor wafer to obtain a third resistance value;

comparing the third resistance value with a range enclosed by the first and the second resistance to determine whether the real furnace temperature is maintained within the lower limit and the higher limit of the target temperature.

12. The method of claim 11, wherein the ions include P type ions.

13. The method of claim 11, wherein the ions include N type ions.

14. The method of claim 11, wherein the higher limit of the target temperature is about (100+10)% of the target temperature.

15. The method of claim 11, wherein the lower limit of the target temperature is about (100−10)% of the target temperature.

16. The method of claim 11, wherein the semiconductor thermal process includes an annealing process.

17. The method of claim 11, wherein the semiconductor thermal process includes a densification process.

18. The method of claim 11, wherein the semiconductor thermal process includes an ion drive-in process.

19. The method of claim 11, wherein the sacrificial layer includes a silicon oxide layer.

20. The method of claim 19, wherein the sacrificial layer has a thickness of about 4000 Å.

21. The method of claim 11, wherein the sacrificial layer includes a silicon nitride layer.

* * * * *